(12) United States Patent
Agarwal et al.

(10) Patent No.: US 12,505,114 B1
(45) Date of Patent: Dec. 23, 2025

(54) NEAR REAL-TIME ANALYTICS USING STRUCTURES REPRESENTING DATA DISTRIBUTIONS

(71) Applicant: Cisco Technology, Inc., San Jose, CA (US)

(72) Inventors: Nishant Agarwal, Santa Clara, CA (US); Rajesh Raman, Palo Alto, CA (US); Joseph Ari Ross, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/635,880

(22) Filed: Apr. 15, 2024

(51) Int. Cl.
*G06F 16/2458* (2019.01)
*G06F 17/18* (2006.01)

(52) U.S. Cl.
CPC .......... *G06F 16/2462* (2019.01); *G06F 17/18* (2013.01)

(58) Field of Classification Search
CPC .............................. G06F 16/2462; G06F 17/18
USPC .......................................................... 707/688
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 * | 6/2014 | Zhang | G06F 16/24578 |
| | | | 707/795 |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 * | 11/2018 | Lamas | G06F 16/2291 |
| 11,086,890 B1 * | 8/2021 | Li | G06F 16/2465 |
| 11,347,625 B1 * | 5/2022 | Agarwal | G06F 11/3466 |
| 11,429,627 B2 * | 8/2022 | Burnett | G06F 16/243 |
| 11,775,501 B2 * | 10/2023 | Ross | G06F 11/3476 |
| | | | 707/690 |
| 2019/0098106 A1 * | 3/2019 | Mungel | H04L 67/564 |

(Continued)

OTHER PUBLICATIONS

Splunk Enterprise 8.0.0 Overview, available online, retrieved May 20, 2020 from docs.splunk.com.

(Continued)

*Primary Examiner* — Michael Pham
(74) *Attorney, Agent, or Firm* — Kilpatrick Townsend & Stockton LLP (57) ABSTRACT

Techniques used by an observability system for facilitating near real-time analytics using structures representing or summarizing data distributions, such as histograms. An observability system receives a set of datapoints in which each received datapoint includes data for a structure representing a data distribution. For example, each of the datapoints may include data for a histogram including at least two dimensions. A processing pipeline is disclosed for processing the received data and making the results of the processing available to a user in near real-time. The processing includes identifying, from the datapoints received by the observability system, a subset of datapoints that fall within a time window, generating aggregate data based upon data in the identified subset of datapoints, computing one or more statistical measures based upon the aggregate data, and enabling querying of the subset of datapoints, the aggregate data, and the statistical measures computed for the first minute.

20 Claims, 6 Drawing Sheets

(56) References Cited

U.S. PATENT DOCUMENTS

2023/0136216 A1     5/2023     Koundinya et al.
2023/0137103 A1     5/2023     Koundinya et al.

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

"Data Resolution and Rollups in Charts", Available Online at: https://docs.splunk.com/observability/en/data-visualization/charts/data-resolution-and-rollups.html#rollups, Accessed from Internet on Apr. 8, 2024, pp. 1-17.

"Histogram", Available Online at: https://opentelemetry.io/docs/specs/otel/metrics/data-model/#histogram, Accessed from Internet on Apr. 8, 2024, pp. 1-29.

"Histogram_Percentile( )", Available Online at: https://dev.splunk.com/observability/docs/signalflow/functions/histogram_percentile_function/, Accessed from Internet on Apr. 8, 2024, pp. 1-5.

"Quantiles", Available Online at: https://github.com/signalfx/signalflow-library/tree/master/library/signalfx/stats/quantiles, Accessed from Internet on Apr. 8, 2024, pp. 1-4.

"Splunk Infrastructure Monitoring Analytics", Available Online at: https://docs.splunk.com/observability/en/analytics/infrastructure-monitoring-analytics.html#infrastructure-monitoring-analytics, Accessed from Internet on Apr. 8, 2024, pp. 1-5.

"Splunk Observability Cloud Data Model Basics", Available Online at: https://dev.splunk.com/observability/docs/apibasics/data_model_basics/, Accessed from Internet on Apr. 8, 2024, pp. 1-3.

\* cited by examiner

NEAR REAL-TIME ANALYTICS USING STRUCTURES REPRESENTING DATA DISTRIBUTIONS

FIELD

The present disclosure generally relates to observability systems, and more particularly relates to techniques used by an observability system for facilitating near real-time analytics using structures representing or summarizing data distributions, such as histograms.

BACKGROUND

The ever-increasing complexity of software applications has made it very difficult to quickly diagnose problems when something goes wrong in an application. The increase in complexity is driven by adoption of new architectures, such as distributed microservices-based architectures, and more complex front-end and back-end implementations. Customers and users of these applications are however demanding better performance from these applications and performance problems (e.g., slow responsiveness, errors, down times) with an application can cause to users stop using the application and use an alternative instead. Providers of software applications thus need tools that facilitate performance monitoring of the software applications, early identification of any problems, and quick resolution of any problems.

This has led to increased popularity of observability systems. These systems are configured to facilitate real-time monitoring of software applications and near real-time analysis of the data captured from the monitoring. For example, an observability system configured to monitor the performance of a software application may monitor and receive data related to the execution of the software application, perform near real-time analysis of the received data, generate actionable data, output the analyses results via dashboards, etc. These dashboards can then be used by providers of the software application, site reliability engineers (SREs), and others to detect any performance issues with the software application and take steps to remediate the detected problems or issues.

Observability systems may configured for monitoring software applications, websites and web applications, user interaction with applications, and the like. An observability system typically receives large volumes of data. This observability system then ingests the data, analyzes the data to generate analyses results, and provides the analyses results to consumers of those results, such as SREs that are tasked with maintaining the performance of the monitored application. The success or failure of any observability system depends upon the type of data that the observability system can receive and process and how fast it can do this processing. Observability systems are continually looking for ways to expand their functionalities and improve the speed of their processing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of techniques for near real-time analytics using histograms. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

The present disclosure generally relates to observability systems, and more particularly relates to techniques used by an observability system for facilitating near real-time analytics using structures representing or summarizing data distributions, such as histograms. In certain implementations, an observability system receives a set of datapoints in which each received datapoint contains data for a structure representing a data distribution. For example, each datapoint may include a data structure storing data representing a histogram including at least two dimensions. A processing pipeline is disclosed for processing the received data and making the results of the processing available to a user in near real-time.

For example, an observability system may receive a set of datapoints, where each received datapoint can include a data structure storing data for a structure representing or summarizing data distributions, such as a histogram. In certain implementations, the histogram can be visualized as a chart that represents a frequency distribution of discrete or continuous data. Each datapoint is typically associated with a time (e.g., a timestamp), and the datapoints may be received as a stream of data.

As indicated above, each datapoint may store data for a structure representing or summarizing a data distribution. For example, each datapoint may include information for a histogram, and a set or series of datapoints may represent and store data for a set of histograms. In certain implementations, a datapoint may include a data structure that stores data for the histogram represented by the datapoint. Various different data structures (or instances of data structures) may be used to store the histogram data (or in general, data for structures representing or summarizing data distributions)

such as arrays, linked lists, or even more specialized or customized data structure types. In certain implementations, specialized data structures may be used. For example, in the use case where the structures are histograms, a special histogram data structure type may be provided and instances of this special data structure type may be used to store the histograms data. Each datapoint may include an instance of this special data structure type that stores the histogram data.

Based upon the times associated with the datapoints, the observability system determines a set of datapoints associated with a particular time period or time window. For example, the length or time span of the time window may be a minute, 5 minutes, an hour, 24 hours, etc. Based upon the set of datapoints associated with the time window, the observability system generates aggregate data for the time window based upon the data included in the set of datapoints.

The aggregate data may represent an aggregate histogram that is an aggregation of the histograms corresponding to the set of datapoints. For example, aggregate data representing an aggregate histogram may be generated in which the aggregate histogram is an aggregation of the histograms corresponding to the set of datapoints. The observability system then computes a set of one or more statistical measures based upon the aggregate data. The observability system then enables querying of the set of datapoints, the aggregate data, and the set of statistical measures computed by the observability system. Various different statistical measures may be computed by the observability system based upon the aggregate data. These include but are not limited to percentiles, quantiles, maximum (max) and minimum (min) values, etc.

In certain implementations, the processing performed by the observability system upon receiving the set of datapoints, from ingesting the datapoints, generating the aggregate data, computing the set of one or more statistical measures based upon the aggregate data, and enabling querying of the set of datapoints, the aggregate data, and the set of statistical measures, is performed in near real-time. In certain implementations, in near real-time means that the querying of the set of datapoints, the aggregate data, and the set of statistical measures is enabled within two seconds of the datapoints being received by the observability system. In other implementations, in near real-time means that the querying is enabled within three seconds of the datapoints being received by the observability system. In yet other implementations, in near real-time means that the querying is enabled within five seconds of the datapoints being received by the observability system. In yet other implementations, in near real-time means that the querying is enabled within six seconds of the datapoints being received by the observability system.

In certain implementations, each datapoint received by the observability system includes data for a histogram, where the histogram comprises data values for at least a first dimension (e.g., a first axis such as an x-axis) and a second dimension (e.g., a second axis such as a y-axis). A histogram can be used to graphically represent a frequency distribution of data, where the data can be discrete data or continuous data. A histogram includes multiple buckets (also referred to as rectangles, bins, or bars). Along one dimension, each bucket is associated with and represents a class interval or a value range. Along a second dimension, each bucket has an associated height that indicates the frequency or count of data associated with the class interval or value range represented by that bar. A histogram including multiple such buckets is a graphical representation of the frequency distribution of the data across the value ranges or class intervals represented by the buckets in the histogram.

In this regard, a value range can refer to the quantified span of numeric values associated with each bucket. For instance, a value range may have a lower bound or an upper bound. In some examples, one or both bounds may be infinite or undefined, thus including all data below or above a certain bound, respectively. The term class interval can be used to describe buckets for grouping qualitative data. For example, the class interval may be used when considering qualitative data representing distinct categories or groups, where each bucket represents a specific class within which data points are classified, which can facilitate analysis of non-numeric data.

In certain implementations, when graphically output, the buckets of a histogram may be depicted such that the classes or value ranges (the first dimension) represented by the buckets are depicted along the x-axis of a two dimensional chart and the frequencies or counts (second dimension) are depicted along the y-axis of the chart.

While the various embodiments and examples described in this disclosure describe processing of data that represents histograms, this is not intended to be limiting. The scope of the claimed embodiments also includes other structures representing or summarizing data distributions, such as pie charts, bar graphs, frequency polygons, dot plots, box plots, and so on. For example, one such structure may include data that identifies multiple classes with a frequency distribution for each class. The structures representing or summarizing data distributions can also include structures with 3 or more dimensions, such as 3-dimensional histograms, and so on.

The datapoints that are processed by the observability system may be received by the observability system in various different formats and using different communication channels. In certain implementations, the datapoints may be received via one or more data streams (e.g., a metric time series or MTS). In a data stream, each datapoint received in the data stream has a common schema and is associated with a time (e.g., a timestamp). The schema of the datapoints refers to the various elements included in each datapoint, such as a timestamp, a data structure storing data for a histogram (or other structure representing or summarizing data distributions), and additional metadata that characterizes the datapoints (e.g., data sources, environments, etc.).

Timestamps for datapoints in the stream may be added by the source of the data stream. In some embodiments, the observability system may receive data (e.g., log data) and may itself generate a data stream based upon the received data. In such an embodiment, the timestamps for the datapoints in stream may be added by the observability system based upon when the data corresponding to the datapoints is received by the observability system. In some other use cases, the observability system may obtain or read the datapoints from a memory location, such as a data store.

The following provides an example of how the teachings described in this disclosure may be applied to a particular use case. Suppose an observability system is configured to track the latency for services A and B in environments X and Y. There are thus four entities that are tracked, corresponding to the pairs (A, X), (A, Y), (B, X), (B, Y). Suppose we wish to compute using histograms with 10 buckets, with upper bounds 10, 50, 100, 500, 1000, 5000, 10000, 50000, 100000, and ∞ (no upper bound). In the past, this required the use of 40 data streams: one data stream for each bucket of each entity, or 4 entities multiplied by 10 buckets per entity.

An example of a datapoint in the past could be represented as:

{service=A, environment=X, le=10, value=5}

This representation could be interpreted as "service A in environment X responded to 5 requests in 10 ms or less" (during the time window captured by this point). Processing this many data streams required a lot of observability system resources, including processing, memory, and networking resources.

Sending the data using histograms reduces the number of data streams required and thus reduces the number of observability system resources needed for processing the incoming data. For example, instead of needing 40 different time series to send the data, only four time series may be needed, one for each of the four entities (A, X), (A, Y), (B, X), (B, Y), in which a datapoint in each of the time series includes data representing a histogram. An example datapoint from a data stream corresponding to (A, X) may be represented as follows:

{service=A, environment=X, buckets=[10, 50, 100, 500, 1000, 5000, 10000, 50000, 100000, ∞], counts=[5, 17, 23, 51, 175, 326, 645, 1003, 2019]}

As can be seen from the above example, the datapoint stores data for a histogram comprising ten buckets representing ten classes (first dimension): 10, 50, 100, 500, 1000, 5000, 10000, 50000, 100000, ∞. There is a count (second dimension) associated with each bucket representing a particular class. For example, the histogram has: a first bucket of the histogram representing class "response in 10 ms or less" and has a count of 5 (i.e., the first bucket indicates that service A in environment X responded to 5 requests in 10 ms or less); a second bucket representing "response between 10 ms to 50 ms" and has a count of 17 (i.e., the second bucket indicates that service A in environment X responded to 17 requests in between 10 ms to 50 ms); a third bucket representing "response between 50 ms to 100 ms" and has a count of 23 (i.e., the third bucket indicates that service A in environment X responded to 17 requests in between 50 ms to 100 ms); a fourth bucket representing "response between 100 ms and 500 ms" and has a count of 23 (i.e., the fourth bucket indicates that service A in environment X responded to 51 requests in between 100 ms and 500 ms); and so on.

The processing of such data reduces the processing burden on the observability system since it now had to process only four different data streams. However, the processing pipeline of the observability system now has to be able to handle processing of such data. As described in this disclosure, a new and novel processing pipeline is disclosed for processing such data. The processing pipeline is such that is enables the processing to be performed in near real-time, as measured from the time when the datapoints are received by the observability system.

The data stored by the histograms can be useful for various applications. For example, in certain use cases, each received histogram may represent a metric (or multiple metrics) in which values for multiple classes are measured. The metric or metrics may be related to applications or computer environment entities (e.g., computer systems, devices) being monitored by the observability system. For example, in the services example described above, the metric may be "responsiveness of a service in a particular environment." In this example, the classes may correspond to a set of time ranges (e.g., 0-1 ms, 1-10 ms, etc.). The datapoints may include data for other metrics in other use cases and other embodiments.

As described above, the observability system may identify datapoints associated with particular time periods or windows, generate aggregate data for the time period based upon the datapoints that are deemed to fall in that time period, compute one or more statistical measures based upon the aggregate data, and then enable querying of the datapoints that fall in the time period, the statistical measures computed for the time period, and the aggregate data. For example, an observability system may be configured to perform processing for the following time periods or windows: a minute, one hour, and a day (24 hours). For the minute period, the observability system may:

For a first minute, identify, from the datapoints received by the observability system, a subset of datapoints having associated times within the first minute, generate aggregate data for the first minute upon data in the identified subset of datapoints, compute one or more statistical measures based upon the aggregate data, and then enable querying of the subset of datapoints that fall in the first minute, the statistical measures computed for the first minute, and the aggregate data. For example, the observability system may identify 20 datapoints that, based upon their associated times, are deemed to fall in the first minute, with each datapoint including data corresponding to a data visualization such as a histogram. The observability system then generates aggregate data for the first minute based upon data in the identified 20 datapoints. The observability system then computes one or more statistical measures based upon the aggregate data, where the aggregate data may represent an aggregate histogram that is a combination or aggregate of the histograms corresponding to the 20 datapoints. The observability system then enables querying of the 20 datapoints, the statistical measures computed for the first minute, and the aggregate data generated based upon the data in the 20 datapoints.

For a second minute-Identify, from the datapoints received by the observability system, a subset of datapoints having associated times within the second minute, generate aggregate data for the second minute upon data in the identified subset of datapoints, compute one or more statistical measures based upon the aggregate data, and then enable querying of the subset of datapoints that fall in the second minute, the statistical measures computed for the second minute, and the aggregate data. For example, the observability system may identify 37 datapoints that, based upon their associated times, are deemed to fall in the second minute, with each datapoint including data corresponding to a data visualization such as a histogram. The observability system then generates aggregate data for the second minute based upon data in the identified 37 datapoints. The observability system then computes one or more statistical measures based upon the aggregate data, where the aggregate data may represent an aggregate histogram that is a combination or aggregate of the histograms corresponding to the 37 datapoints. The observability system then enables querying of the 37 datapoints, the statistical measures computed for the second minute, and the aggregate data generated based upon the data in the 37 datapoints.

And so on for each minute.

For the one hour period, the observability system may:

For the first hour—Identify, from the datapoints received by the observability system, a subset of datapoints having associated times within the first hour, generate aggregate data for the first hour upon data in the identified subset of datapoints, compute one or more statistical measures based upon the aggregate data, and then enable querying of the subset of datapoints that fall in the first hour, the statistical measures computed for the first hour, and the aggregate data.

For a second hour—Identify, from the datapoints received by the observability system, a subset of datapoints having associated times within the second hour, generate aggregate data for the second hour upon data in the identified subset of datapoints, compute one or more statistical measures based upon the aggregate data, and then enable querying of the subset of datapoints that fall in the second hour, the statistical measures computed for the second hour, and the aggregate data.

And so on for each hour.

For the one day (or 24 hours) period, the observability system may:

For the first day—Identify, from the datapoints received by the observability system, a subset of datapoints having associated times within the first day, generate aggregate data for the first day upon data in the identified subset of datapoints, compute one or more statistical measures based upon the aggregate data, and then enable querying of the subset of datapoints that fall in the first day, the statistical measures computed for the first day, and the aggregate data.

For a second day—Identify, from the datapoints received by the observability system, a subset of datapoints having associated times within the second day, generate aggregate data for the second day upon data in the identified subset of datapoints, compute one or more statistical measures based upon the aggregate data, and then enable querying of the subset of datapoints that fall in the second day, the statistical measures computed for the second day, and the aggregate data.

And so on for each day (or 24 hour periods).

As discussed above, the observability system enables querying of the subset of datapoints that fall within a time window, the aggregate data generated based upon the datapoints, and of the statistical measures computed for the time window based upon the aggregate data. The observability system may include components such as an analytics or dashboard subsystem that can enable users to query the data made available for querying. For example, a user using a client device can connect to the observability system and perform the querying. In certain implementations, the queryable data may be stored in a storage subsystem of the observability system. The observability system may provide various interfaces or mechanisms (e.g., via application programming interfaces (APIs), or graphical user interfaces (GUIs)) to facilitate the querying. The query results may be used to populate dashboards, generate reports, or transmit alerts or notifications. For example, an alert or notification may be sent when certain predetermined thresholds are exceeded or certain conditions are satisfied.

Embodiments described in this disclosure provide significant technical improvements in the context of observability systems. As described herein, the observability system is able to ingest and process complex structures that are used to represent or summarize data distributions. This increases the analysis capabilities of the observability system, enabling complex and complicated analysis to be performed in near-real time. A new innovative data processing pipeline is described that enables observability systems to process the complex data in near real-time. Further, the processing is performed while conserving computational resources of the observability system. Likewise, redundant and inaccurate statistical measures and other related aggregations no longer need to be performed and instead can be performed more efficiently by the observability platform, which can store the results and preclude any need to recompute previously determined potentially inaccurate statistical measures.

Figure 1:
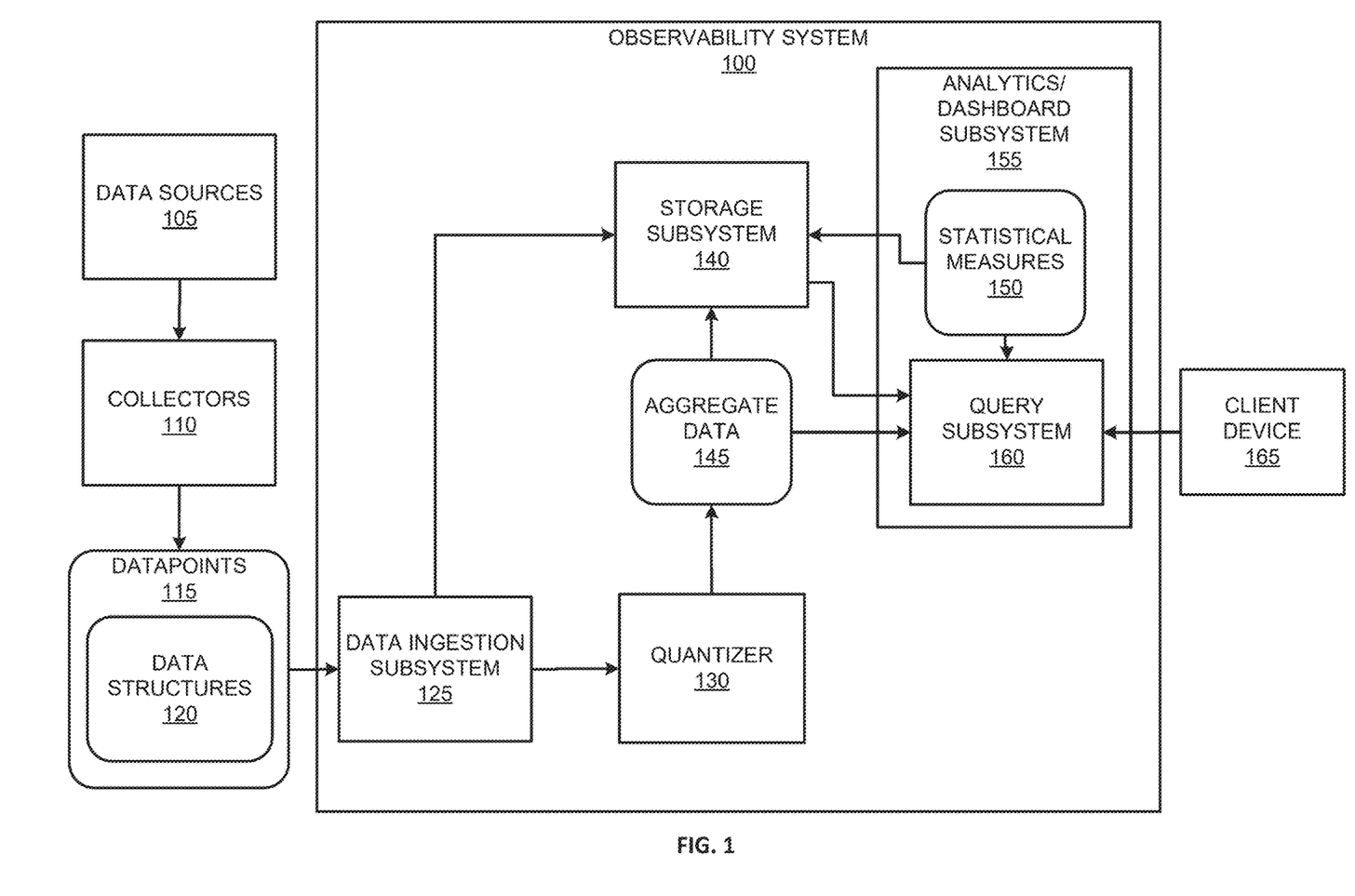
FIG. 1 shows an example of an observability system, according to some aspects of the present disclosure.

The following sections describe various non-limiting examples and embodiments incorporating the teachings described in this disclosure. Referring first to FIG. 1, FIG. 1 shows an example of an observability system 100. The observability system 100 may be implemented using one or more data processing systems and computing devices. As shown, the observability system 100 comprises multiple systems and subsystems that are communicatively coupled to each. The systems in FIG. 1 include a data ingestion subsystem 125, a quantizer 130, storage subsystem 140, and an analytics/dashboard subsystem 155.

Observability system 100 depicted in FIG. 1 is merely an example and is not intended to unduly limit the scope of claimed embodiments. Many variations, alternatives, and modifications are possible. For example, in some implementations, the observability system 100 may have more or fewer systems or subsystems than those shown in FIG. 1, may combine two or more systems or subsystems, or may have a different configuration or arrangement of systems or subsystems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device) and executed by one or more processors of the observability system 100.

In certain implementations, the observability system 100 may be implemented in a cloud environment using infrastructure provided by a cloud service provider (CSP). In such an embodiment, the functions performed by the observability system 100 and described in this disclosure may be offered via a cloud service to one or more customers subscribing to the cloud service.

Data for the datapoints is derived from data sources 105. The data sources 105 can include a hardware or software system being monitored using the observability system 100. For example, the data sources 105 may include systems such as application servers, databases, network routers, storage systems, virtual machines, operating systems, and so on. The data sources 105 may themselves be other observability systems such as network traffic monitors, application performance management tools, and so on.

The data for the datapoints is collected from the data sources 105 using one or more collectors 110. Collectors 110 may include components that can receive, process, and export telemetry data or other forms of data generated by data sources 105. The collectors 110 may receive data in various formats and send the data to one or more other systems. The collectors may perform processing, filtering, and other data processing functions before exporting the data to telemetry data before it gets exported to the one or more other systems.

In some examples, the collectors 110 may use one or more standardized protocols for generation of and transmission of the datapoints. Examples of such protocols include the OpenTelemetry Protocol (OTLP), Jaeger, Prometheus, and others. The collectors may, for example, receive data from the data sources 105 and instantiate or otherwise generate datapoints 115. The collectors 110 may generate formats for transmission of the data such data streams. The generated datapoints 115 can include data structures 120 storing data for structures representing or summarizing data distributions such as histograms.

The datapoints 115 may be internally represented in the collectors 110 using a suitable data structure and then serialized before transmission to the observability system 100. For example, the datapoints 115 may be serialized to a JavaScript Object Notation (JSON) format or an extensible Markup Language (XML) format prior to transmission. In some examples, the datapoints may be compressed before sending to the observability system 100.

The datapoints 115 are received by a data ingestion subsystem 125. In some examples, datapoints 115 can be manually ingested into the observability system 100 using a web-based graphical user interface (GUI) or other web-based API provided by the data ingestion subsystem 125. In some examples, datapoints 115 can be sent to the data ingestion subsystem 125 using a forwarder in conjunction with the collectors 110. For example, the forwarder may be a software program that executes in parallel with the collectors to forward datapoints to the data ingestion subsystem 125 as they are collected. In some examples, the forwarder may include data processing and analysis features. For instance, some server software includes integrated program code or extensions for forwarding datapoints 115 to the data ingestion subsystem 125.

The received datapoints 115 are passed to a quantizer 130. The quantizer 130 can include components for aggregating datapoints into aggregate formats as well as other functions such as dynamic lag adjustment, in which the timing of data processing is optimized based on the delay between data generation and its availability for processing or querying. The quantizer output 130 may generate, for example, aggregate data 145.

In one example, the quantizer 130 can process datapoints 115 received so as to transform input datapoints 115 in which data is available at arbitrary times to a data stream or other format in which data is available at regular time intervals. For example, the data values received in the input datapoints may occur at irregular intervals that may change from one consecutive pair of data values received to the next pair of data values received. However, the quantizer 130 can process the input datapoints to generate a data stream or other format with data occurring periodically (at regular time intervals), such as every second, or every 5 seconds, or every 15 seconds, and so on. This process is referred to herein as quantization of the data stream. The quantizer 130 can utilize multiple threads or processes, in which each thread or process is configured to receive particular input datapoints according to a suitable partitioning scheme. Each thread or process can invoke the quantizer 130 to perform quantization of the data received for each data stream for each time interval.

In some examples, the quantizer 130 can select or identify a number of datapoints from a particular time period and perform an aggregation or consolidation operation to generate the aggregate data 145. For example, if the quantizer 130 receives 20 histograms collected during a 1 minute period, the quantizer 130 can combine the 20 histograms using a suitable combination process to generate aggregate data 145 such as an aggregate histogram. Example processes for combining histograms include simple summation, computing the average counts for each bucket, extrapolation from a minimum or maximum count, merging buckets, or use of interpolation, among other methods.

The received datapoints 115 are also passed to a storage subsystem 140. The storage subsystem 140 can include components for storing the datapoints 115, as well as derived data such as aggregate data 145 and statistical measures 150 computed by an analytics/dashboard subsystem 155, as described below. The storage subsystem 140 may be one or more local disk drives, a network storage device, cloud storage provider, a database, or a combination thereof. For instance, the storage subsystem 140 may include a document-based database configured to store unstructured or semi-structured data indexed according to the dimensions included in the datapoints 115. The queries received from the query subsystem 160 of the analytics/dashboard subsystem 155, which may include filters or parameters based on the datapoint dimensions, may thus be optimized under this indexing scheme. In some examples, a database thus configured may include a cache or other in-memory database that includes similarly indexed, recently queried, or precomputed values or aggregations that can be provided to suitable queries even faster than the database.

The observability system includes the analytics/dashboard subsystem 155 which may be provided as part of the cloud infrastructure monitoring platform. For example, the observability system may be implemented using cloud infrastructure provided by a cloud services provider. The analytics/dashboard subsystem 155 includes components for consuming the received and derived data in service of various analytics operations along with the generation of reports, visualizations, or dashboards and tools for configuring notifications or raising alerts, alarms, or warnings. The analytics/dashboard subsystem 155 can include components that are user-facing and may be accessed using a client device 165.

The analytics/dashboard subsystem 155 also generates one or more statistical measures 150. The statistical measures 150 may be based on the aggregate data 145. For example, the aggregate data 145 may be an aggregate histogram as described above. From the aggregate histogram, a variety of statistical measures 150 can be computed including the mean, median, mode, standard deviation, variance, range, percentiles, quantiles (e.g., quartiles), interquartile range, skewness, kurtosis, and so on. The statistical measures 150 may be output as scalar, numerical values or as part of a summary analysis object including a variety of computed measures based on the aggregate data 145. The computed statistical measures 150 can be stored in the storage subsystem 140 and/or in a storage component of the analytics/dashboard subsystem 155 itself, which may facilitate faster access via the querying subsystem.

The client device 165 can be any suitable device or computing system for accessing the analytics/dashboard subsystem 155 such as a laptop, desktop, smartphone, tablet, etc. The client device 165 can be used, for example, to access a GUI or API provided by the analytics/dashboard subsystem 155. The GUI or API can be used for querying the analytics/dashboard subsystem 155 to generate visualizations and conduct other monitoring operations. The GUI or API can also be used to configure and operate the observability system 100.

The analytics/dashboard subsystem 155 includes a query subsystem 160 that can facilitate access to the received and derived data. The query subsystem 160 can be used to query the aggregate data 145 before it is stored or data persisted in the storage subsystem 140, or a combination thereof. In some examples, querying the aggregate data 145 directly may be faster since no storage operations are involved.

In some examples, querying of the received datapoints 115, the aggregate data 145, and the statistical measures derived therefrom is enabled for querying within 2 seconds of the receiving of the set of datapoints by the observability system 100 at the data ingestion subsystem 125. In some other examples, querying of the received datapoints 115, the aggregate data 145, and the statistical measures derived therefrom is enabled for querying within 1 seconds. In some other examples, querying of the received datapoints 115, the aggregate data 145, and the statistical measures derived therefrom is enabled for querying within 3 seconds. In some other examples, querying of the received datapoints 115, the aggregate data 145, and the statistical measures derived therefrom is enabled for querying within 4 seconds. In some other examples, querying of the received datapoints 115, the aggregate data 145, and the statistical measures derived therefrom is enabled for querying within 5 seconds. In some other examples, querying of the received datapoints 115, the aggregate data 145, and the statistical measures derived therefrom is enabled for querying within 6 seconds. In some examples, querying of the received datapoints 115, the aggregate data 145, and the statistical measures derived therefrom is enabled for querying within 10 seconds. These and other examples correspond to some definitions of "near real-time" as used herein.

In some examples, querying of the received datapoints 115, the aggregate data 145, and the statistical measures derived therefrom is enabled for querying within a period of time dynamically determined based on patterns reflected by the received datapoints 115. For example, if a data stream of datapoints 115 includes a large set of datapoints within a short period of time (e.g., less than 0.1 seconds) then querying may be enabled within 2 seconds of the receiving of the last of the large set of datapoints. On the other hand, if a data stream of datapoints 115 includes a small set of datapoints within a longer period of time (e.g., less than 3 seconds) then querying may be enabled within 1 second of the receiving of the last of the small set of datapoints.

The query subsystem 160 may provide an API for using an analytics engine that can enable analysis of received or derived data, develop visualizations, and other related functions. The analytics engine may be instructed by way of an analytics pipeline scripting language that can be used to perform analytics on received or derived data. The analytics engine may include a library of functions and methods to perform a variety of analysis operations and may be extensible for the performance of custom analysis operations. For instance, the analytics pipeline scripting language may be a Python-like language, familiar to users, which can be used to develop program code for analytics operations. The analytics pipeline scripting language can be executed by a computation engine configured to execute program code and generate data streams or other suitable outputs.

Figure 2:
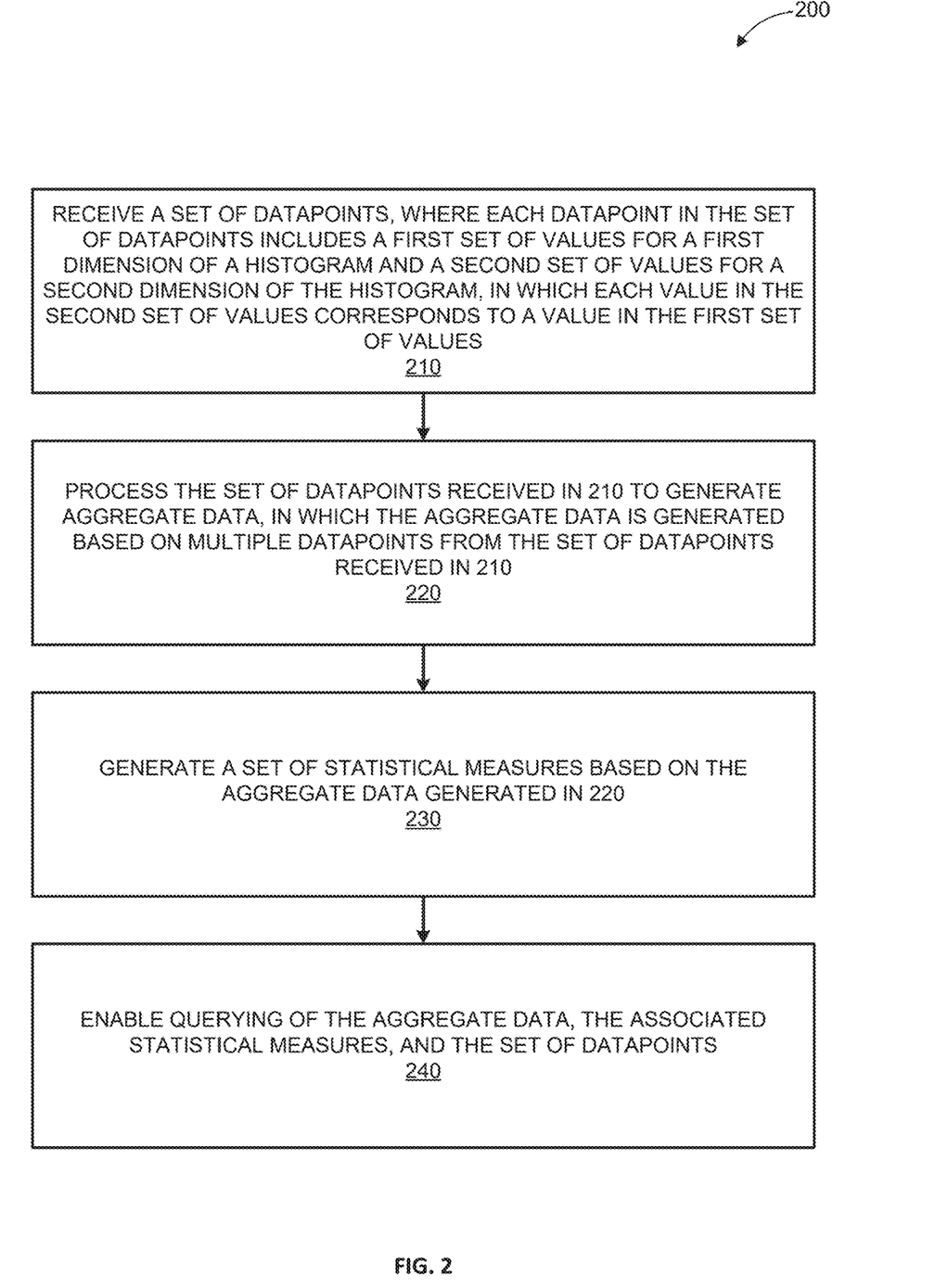
FIG. 2 shows a flowchart of an example method for providing near real-time analytics of data for structures, such as histograms, that represent or summarize data distributions, according to some aspects of the present disclosure.

Referring now to FIG. 2, FIG. 2 shows a flowchart of an example method 200 for providing near real-time analytics of data for structures, such as histograms, that represent or summarize data distributions, according to some aspects of the present disclosure. The description of the method 200 in FIG. 2 will be made with reference to FIG. 1, however any suitable system according to this disclosure may be used. Other sequences of operations may also be performed according to alternative examples. For example, alternative examples of the present disclosure may perform the steps outlined above in a different order. Moreover, the individual operations illustrated by method 200 may include multiple sub-operations that may be performed in various sequences as appropriate to the individual operation. Furthermore, additional operations may be added or removed depending on the particular applications. Further, the operations described in method 200 may be performed by different devices. For example, the description is given from the perspective of the observability system 100 but other configurations are possible. One of ordinary skill in the art would recognize many variations, modifications, and alternatives.

The method 200 may include block 210. At block 210, the observability system 100 receives a set of datapoints 115, where each datapoint in the set of datapoints 115 includes a first set of values for a first dimension of a histogram and a second set of values for a second dimension of the histogram, in which each value in the second set of values corresponds to a value in the first set of values. The datapoints 115 may be received by a data ingestion subsystem 125. The histogram may be, for example, a 2-dimensional histogram in which the buckets are the first dimension and the counts are the second dimension. However, in some examples, each datapoint in the set of datapoints 115 also includes a third set of values for a third dimension of the histogram, thereby characterizing a 3-dimensional histogram. In this case, each bucket may have bound(s) in the first dimension or the third dimension. Each value in the second set of values corresponds to values in both of the first set of values and the third set of values.

At block 220, the observability system 100 processes the set of datapoints received in 210 to generate aggregate data 145 in which the aggregate data 145 is generated based on multiple datapoints from the set of datapoints received in 210. For example, for a subset of the received datapoints 115 included in period of time, the quantizer 130 can generate aggregate data 145. The generation of the aggregate data 145 for a windowed period of time is sometimes referred to as a "rollup."

If the data structures 120 included in the datapoints 115 store data for histograms, for instance, the aggregate data 145 may be a combination of the histograms such as a simple summation, computing the average counts for each bucket, extrapolation from a minimum or maximum count, merging buckets, or use of interpolation, among other methods. In some examples, the aggregate data 145 is generated automatically for all received datapoints 115. In some other examples, the aggregate data 145 is generated in response to queries relayed by the analytics/dashboard subsystem 155. In the latter example, the received datapoints 115 may be immediately stored and the aggregate data 145 only generated upon demand.

At block 230, the observability system 100 generates a set of statistical measures based on the aggregate data 145 generated in 220. For example, the analytics/dashboard subsystem 155 may receive the aggregate data 145 generated by the quantizer 130 and compute one or more statistical measures 150 such as the mean, median, mode, skew, and so on. The one or more statistical measures 150, along with the aggregate data 145, may be stored in the storage subsystem 140 for querying during block 240, as described below. In some examples, the one or more statistical measures 150 can be persisted locally in the analytics/dashboard subsystem 155 in addition to the storage subsystem 140. For instance, the analytics/dashboard subsystem 155 may include a lightweight, efficient storage mechanism such as an in-memory database or cache for fast access to the computed statistical measures 150 via the query subsystem 160.

At block 240, the observability system 100 enables querying of the aggregate data 145, the associated statistical measures 150, and the set of datapoints 115. For example, the observability system 100 can enable querying operations via the analytics/dashboard subsystem 155. The analytics/dashboard subsystem 155 can itself generate queries as may be necessary during, for instance, periodic generation of or refreshing of dashboards or checking thresholds for notifications, alerts, alarms, warnings, and so on. For example, the analytics/dashboard subsystem 155 can be configured to, for certain time periods (e.g., during a rollup operation), to generate a visualization based upon at least one of: the aggregate data 145, the datapoints 115, or the statistical measures 150. This may occur when a dashboard has been previously designed and configured to be automatically updated at some periodicity through the execution of predetermined queries. In another example, the analytics/dashboard subsystem 155 can received streamed datapoints 115 continuously and update the dashboard automatically according to the configuration of the dashboard as new datapoints 115 are received. The resulting visualization can then be displayed via an output device. For example, the analytics/dashboard subsystem 155 may include one or more connected dashboard displays that can show the automatically updated visualization.

Likewise, the analytics/dashboard subsystem 155 can receive queries from a suitable client device 165. The client device 165 may query the aggregate data 145 or storage subsystem 140 using a suitable analytics pipeline scripting language. In an example, the analytics pipeline scripting language can be used to generate a query that will cause the computation of a particular statistical measure, such as percentile. Consider the example:

histogram("cpu.utilization").percentile(95, over="10 m").publish( );

that calculates a scalar percentile for a set of histograms received by the observability system 100 with in the last 10 minutes. The "histogram" function and the string argument "cpu.utilization" is used to identify or select a subset of the received data stream. The "percentile" method is called on the resulting data stream subset and contains example parameters that indicate that the percentile should be calculated based on the aggregate histogram generated from all of the histograms received in the last 10 minutes. The "publish" method outputs the result of the scalar percentile computation to a suitable output device.

In some examples, querying of the received datapoints 115 or the aggregate data 145 and the statistical measures 150 derived therefrom is configured for a near real-time experience as may be experienced by the user of a client device 165. In some examples, querying may be enabled within 1 seconds of the receiving of the set of datapoints by the observability system 100 at the data ingestion subsystem 125. In some other examples, querying may be enabled within 2 seconds of the receiving of the set of datapoints by the observability system 100 at the data ingestion subsystem 125. In some other examples, querying may be enabled within 3 seconds of the receiving of the set of datapoints by the observability system 100 at the data ingestion subsystem 125. In some other examples, querying may be enabled within 4 seconds of the receiving of the set of datapoints by the observability system 100 at the data ingestion subsystem 125. In some other examples, querying may be enabled within 5 seconds of the receiving of the set of datapoints by the observability system 100 at the data ingestion subsystem 125. In some other examples, querying may be enabled within 6 seconds of the receiving of the set of datapoints by the observability system 100 at the data ingestion subsystem 125. In some other examples, querying may be enabled within 10 seconds of the receiving of the set of datapoints by the observability system 100 at the data ingestion subsystem 125.

In some examples, querying of the received datapoints 115 or the aggregate data 145 and the statistical measures 150 derived therefrom is enabled for querying within a period of time dynamically determined based on based on the timing behavior of received datapoints 115. For example, if a data stream of datapoints 115 includes a large set of datapoints within a short period of time (e.g., less than 0.1 seconds) then querying may be enabled within 2 seconds of the receiving of the last of the large set of datapoints. On the other hand, if a data stream of datapoints 115 includes a small set of datapoints within a longer period of time (e.g., less than 3 seconds) then querying may be enabled within 1 second of the receiving of the last of the small set of datapoints.

Figure 3:
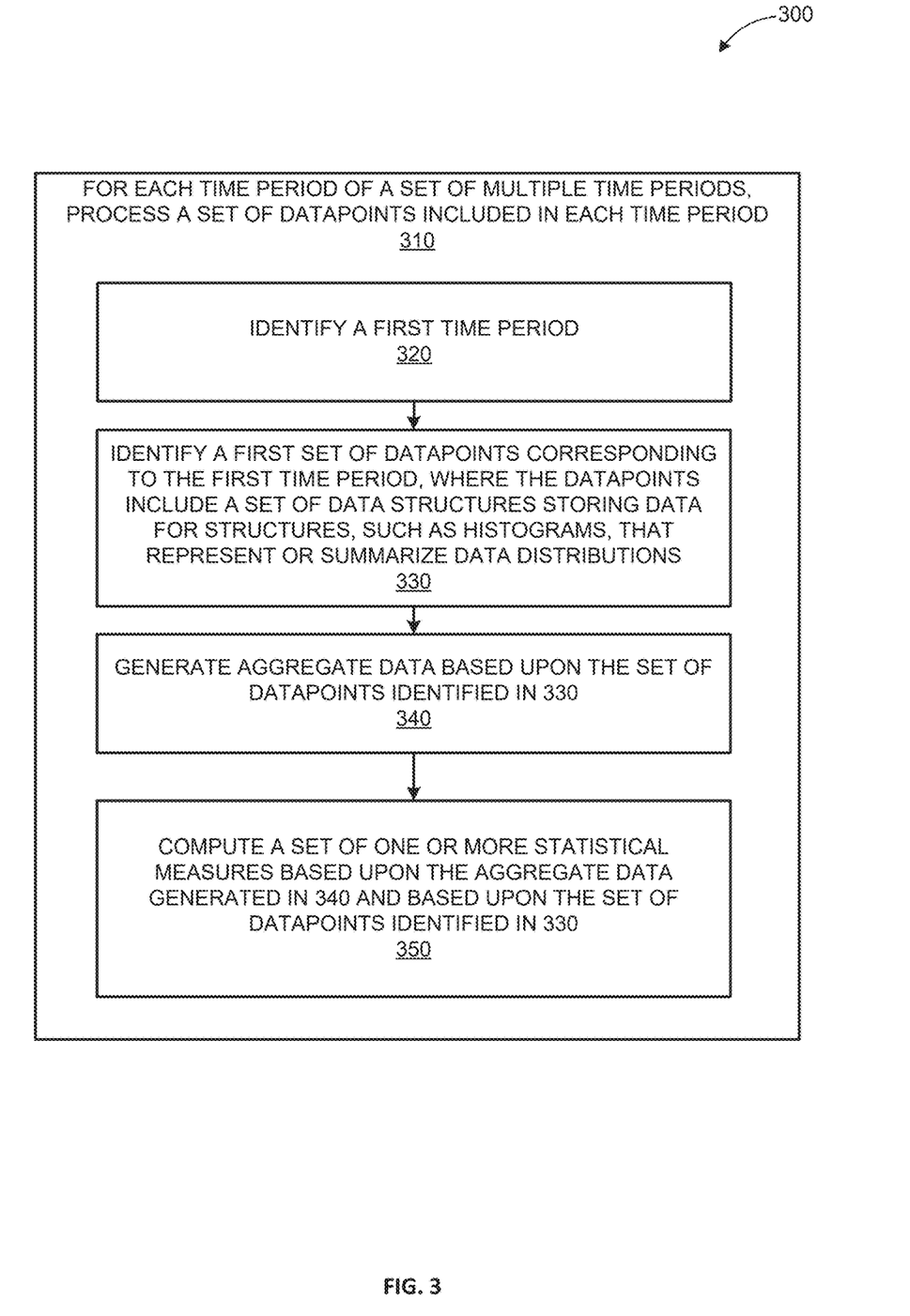
FIG. 3 shows a flowchart of an example method for processing a set of datapoints as part of providing near real-time analytics of data for structures, such as histograms, that represent or summarize data distributions, according to some aspects of the present disclosure.

Referring now to FIG. 3, FIG. 3 shows a flowchart of an example method 300 for processing a set of datapoints as part of providing near real-time analytics of data for structures, such as histograms, that represent or summarize data distributions, according to some aspects of the present disclosure. The description of the method 300 in FIG. 3 will be made with reference to FIG. 1, however any suitable system according to this disclosure may be used. Other sequences of operations may also be performed according to alternative examples. For example, alternative examples of the present disclosure may perform the steps outlined above in a different order. Moreover, the individual operations illustrated by method 300 may include multiple sub-operations that may be performed in various sequences as appropriate to the individual operation. Furthermore, additional operations may be added or removed depending on the particular applications. Further, the operations described in method 300 may be performed by different devices. For example, the description is given from the perspective of the observability system 100 but other configurations are possible. One of ordinary skill in the art would recognize many variations, modifications, and alternatives.

The method 300 may include block 310. At block 310, the observability system 100 processes, for each time period of a set of multiple time periods, a set of datapoints included in each time period. This block may correspond to the processes described in block 220 above with respect to FIG. 2 and is described in greater detail here with respect to one example embodiment.

Block 310 can include several sub-blocks, which can reflect additional detail about certain example embodiments. Block 310 can include sub-block 320. At sub-block 320, the observability system identifies the first time period. For example, the data ingestion subsystem 125 may continuously receive datapoints 115, either individually or as members of a data stream such as a metric time series. The quantizer 130 can be configured to perform an aggregate or "rollup" operation on all datapoints 115 received during successive periods of time. The quantizer 130 can perform aggregate operations on successive time periods or in another order. For example, processing of time periods may be done out of order to optimize the use of computational resources according to the contents of each time period or processing of multiple time periods may be performed in parallel. In this example, the quantizer 130 identifies the most recent elapsed or expired time period and processes it immediately. Such a configuration may result in better throughput with respect to providing enablement of near real-time querying.

At sub-block 330, the observability system 100 identifies a first set of datapoints 115 corresponding to the first time period, where the datapoints include a set of data structures storing data for structures, such as histograms, that represent or summarize data distributions. For example, following the expiration of the most recent time period, the quantizer 130 can identify the datapoints included in the expired time period and process them to generate the aggregate data 145 as will be described in more detail below. Identification of the datapoints may involve examination of a timestamp value included with the datapoints and comparing it with boundaries that define the time period. In some examples, where the datapoints 115 themselves do not include timestamps, the data ingestion subsystem 125 can record the time of receipt of the datapoints 115 which can be used for identification of the included datapoints 115.

At sub-block 340, the observability system 100 generates aggregate data 145 based upon the set of datapoints identified in 330. For example, if the set of datapoints include histograms, the aggregate data 145 may be a combined histogram. Example processes for combining histograms or other structures representing or summarizing data distributions include simple summation, computing the average counts for each bucket, extrapolation from a minimum or maximum count, merging buckets, or use of interpolation, among other methods. The quantizer 130 can be configured for combining histograms in a computationally efficient manner using techniques such as aligning bin boundaries where possible, use of incremental updates to the aggregate data, parallel processing, or data compression.

At sub-block 350, the observability system 100 computes a set of one or more statistical measures 150 based upon the aggregate data 145 generated in 340 and based upon the set of datapoints identified in 330. In some examples, the statistical measures 150 are computed by the analytics/dashboard subsystem 155. For example, from the aggregate data 145, a variety of statistical measures 150 can be computed including the mean, median, mode, standard deviation, variance, range, percentiles, quantiles (e.g., quartiles), interquartile range, skewness, kurtosis, and so on. The statistical measures 150 may be output as scalar, numerical values or as part of a summary analysis object including a variety of computed measures based on the aggregate data 145. In some examples, the statistical measures 150 can be used to populate a suitable data structure that can be returned in response to a query and used by client applications to conveniently obtain the various statistical measures 150.

Figure 4A:
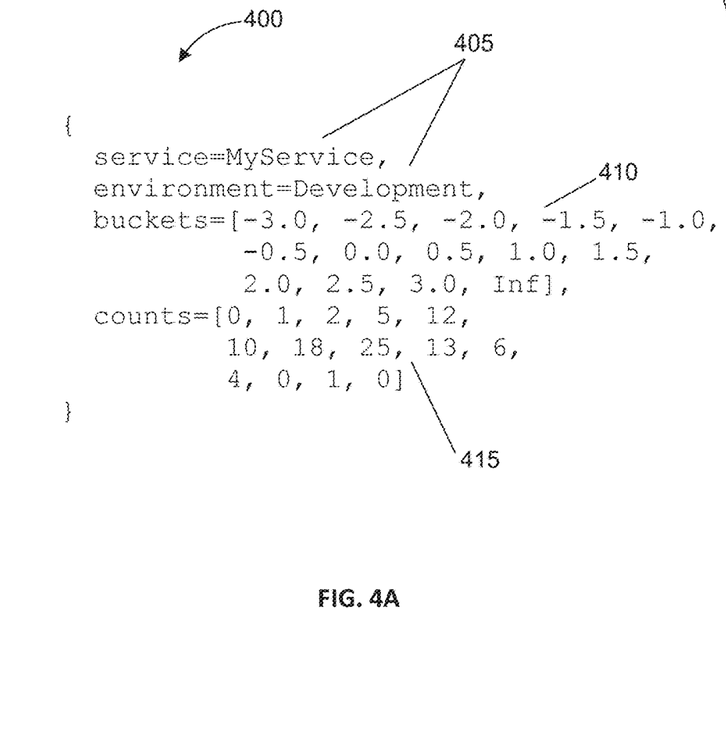
FIGS. 4A and 4B depict examples of a particular type of structure that represents or summarizes data distributions, namely, a two-dimensional histogram, according to some aspects of the present disclosure.
Figure 4B:
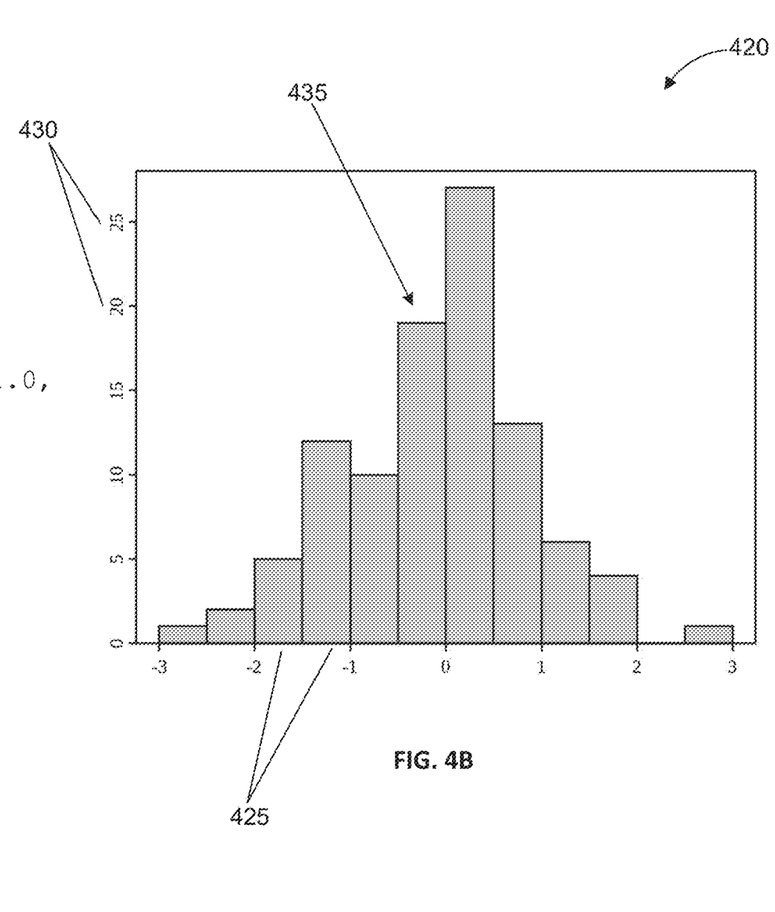

Turning next to FIGS. 4A and 4B, FIGS. 4A and 4B depict examples of a particular type of structure that represents or summarizes data distributions, namely, a two-dimensional histogram, according to some aspects of the present disclosure. As emphasized above, however, the observability system 100 can ingest, process, store, and enable querying on a data received via a variety of structures that represent or summarize data distributions such as N-dimensional histograms.

FIG. 4A shows a textual representation of a datapoint 400 including a histogram as may be received by data ingestion subsystem 125 as part of a data stream. Implementations may represent the datapoint 400 in various ways. The representation in FIG. 4A is a pseudocode representation. Other similar textual representations may use structured or semi-structured data formats suitable for serialization and machine-reading such as JavaScript Object Notation (JSON), extensible Markup Language (XML), and so on. In some examples, the datapoint 400 may represented in accordance with a standardized data collection protocol such as the OpenTelemetry Protocol (OTLP). In some examples, the datapoint 400 may be represented in a binary format that is converted by the data ingestion subsystem 125 into a human-readable format.

Datapoint 400 includes metadata 405. Two metadata 405 elements are shown, but the datapoint 400 can have any suitable number of metadata 405 elements. Metadata 405 may be key-value pairs that add context to the datapoints. The metadata 405 may be added to the datapoint 400 by the collectors 110 prior to transmission. The metadata 405 can be used to uniquely identify the datapoint or to select a subset of a data stream and typically do not change over time. The metadata 405 may include custom properties represented as key-value pairs to add additional context to the metrics. Other examples of metadata 405 include tags, attributes, or span tags.

Datapoint 400 includes buckets 410. In this example, the buckets 410 are depicted as an array of numerical values that explicitly define the upper bound of each bucket and implicitly define the lower bound of each bucket. For example, the array [10, 50, 100, Inf] may correspond to the bucket definitions [−∞, 10], (10, 50], (50, 100], and (100, ∞]. In this notation a "[" bracket denotes an inclusive bound and an "(" bracket denotes an exclusive bound. However, these are just examples and a variety of different approaches to denoting and communicating the bucket definitions are possible. The buckets 410 correspond to the first set of values for a first dimension of a histogram.

Datapoint 400 includes counts 415. The counts 415 correspond to the second set of values for a second dimension of the histogram, where each value in the second set of values corresponds to a value in the first plurality of values. In this example, the counts 415 are depicted as an array of numerical values specifying a scalar count value ranging from 0 to a non-negative integer. In this example, there is a 1-to-1 mapping between the counts 415 and the buckets 410 such that each counts value indicates the counts in the associated bucket. However, as with the buckets 410, various other approaches to denoting and communicating the counts 415 are possible. For example, the buckets 410 and counts 415 could be provided as a multidimensional array or matrix, an associated array, a compressed binary format, and so on.

FIG. 4B depicts an example plotted histogram 420. The plotted histogram 420 is a graphical representation of data similar to the datapoint 400 from FIG. 4A, provided here to introduce certain concepts. Plotted histogram 420 includes buckets 425, with bounds corresponding to the values on the x-axis of plotted histogram 420. The buckets 425 in this visual representation correspond to the buckets 410 of FIG. 4A. Plotted histogram 420 also includes counts which are represented by magnitudes 430 on the y-axis of plotted histogram 420. The plotted counts 435 show several examples of bars drawn whose magnitude (e.g., height) indicate the value of the counts for the respective bucket. The counts in this visual representation correspond to the counts 415 of FIG. 4A.

Figure 5:
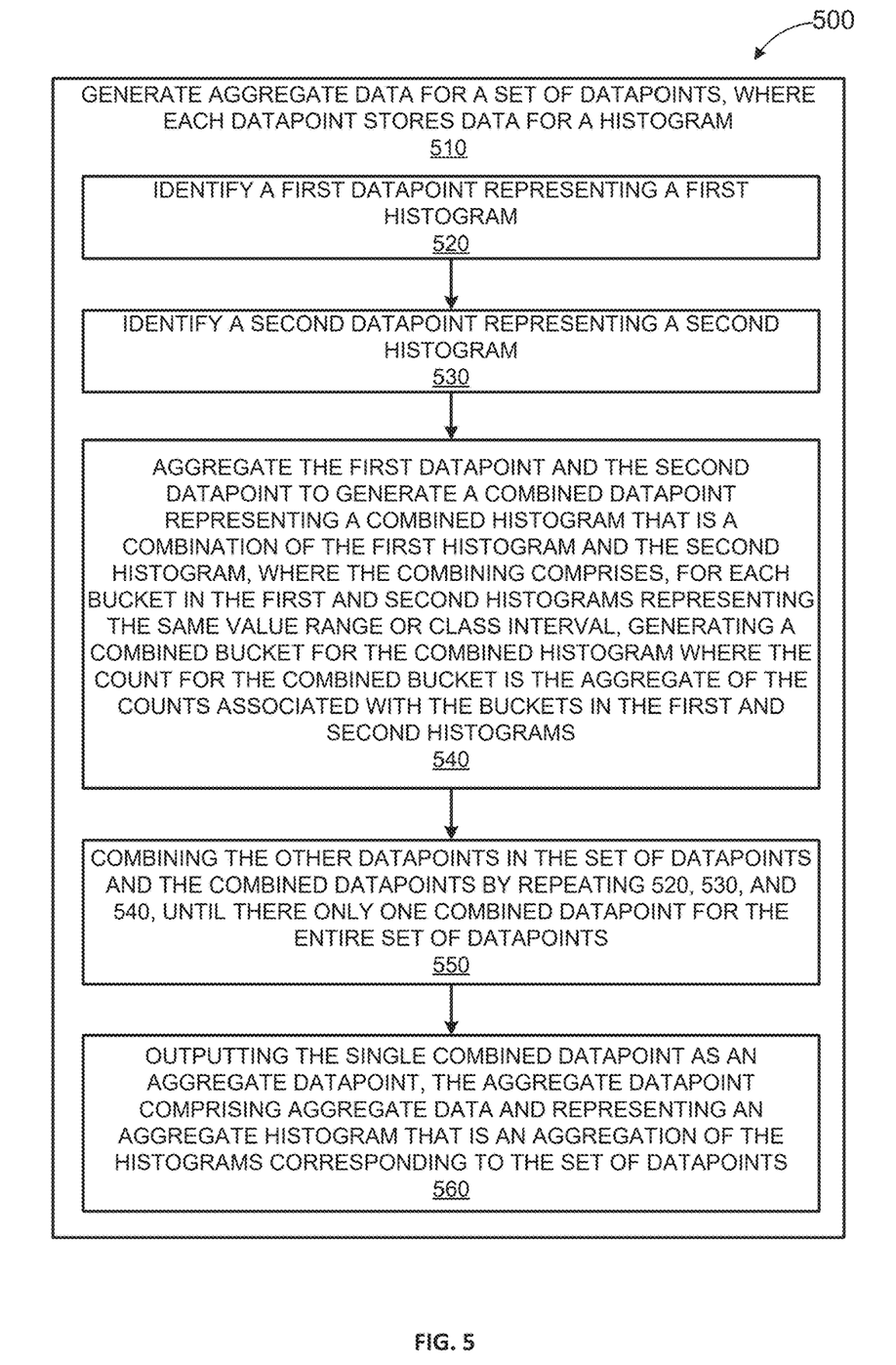
FIG. 5 shows a flowchart of an example method for generating aggregate data for a set of datapoints, where each datapoint contains data for a structure representing a data distribution, such as a histogram, as part of providing near real-time analytics using structures that represent or summarize data distributions, such as histograms, according to some aspects of the present disclosure.

Referring now to FIG. 5, FIG. 5 shows a flowchart of an example method 500 for generating aggregate data for a set of datapoints, where each datapoint contains data for a structure representing a data distribution, such as a histogram, as part of providing near real-time analytics using structures that represent or summarize data distributions, such as histograms, according to some aspects of the present disclosure. The description of the method 500 in FIG. 5 will be made with reference to FIG. 1, however any suitable system according to this disclosure may be used. It should be appreciated that method 500 provides a particular method for providing near real-time analytics using histograms. Other sequences of operations may also be performed according to alternative examples. For example, alternative examples of the present disclosure may perform the steps outlined above in a different order. Moreover, the individual operations illustrated by method 500 may include multiple sub-operations that may be performed in various sequences as appropriate to the individual operation. Furthermore, additional operations may be added or removed depending on the particular applications. Further, the operations described in method 500 may be performed by different devices. For example, the description is given from the perspective of the observability system 100 but other configurations are possible. One of ordinary skill in the art would recognize many variations, modifications, and alternatives.

The method 500 may include block 510. At block 510, the observability system 100 generates aggregate data for a set of datapoints, where each datapoint stores data for a histogram. This block may correspond to, for example, the processes described in sub-block 340 above with respect to FIG. 3 and is described in greater detail here with respect to one example embodiment involving the generation of an aggregate histogram. In this example embodiment, therefore, the data structures store data for histograms.

Block 510 can include several sub-blocks, which can reflect additional detail about certain example embodiments. Block 510 can include sub-block 520. At sub-block 520, the quantizer 130 identifies a first datapoint representing a first histogram and at sub-block 530, the quantizer 130 identifies a second datapoint representing a second histogram. The received histograms may be processed in the order they are received, sorted by timestamp, or sorted according to an algorithmic approach that optimizes computing resource consumption.

At sub-block 540, the quantizer 130 aggregates the first datapoint and the second datapoint to generate a combined datapoint representing a combined histogram that is a combination of the first histogram and the second histogram. The combining comprises, for each bucket in the first and second histograms representing the same value range or class interval, generating a combined bucket for the combined histogram where the count for the combined bucket is the aggregate of the counts associated with the buckets in the first and second histograms.

For example, an example first histogram may include three buckets with bounds at [0, 10], (10, 20], and (20, 30]. Each bucket may in turn include a count, corresponding to an aggregate of data collected falling inside each respective bucket. In this example, the counts in the respective buckets are [5, 10, 15]. An example second histogram may include three buckets with bounds at [0, 10], (10, 20], and (20, 30]. The corresponding counts in the respective buckets are [10, 20, 30]. Using a summation aggregate operation, for each bucket in the first and second histograms representing the same value range or class interval (e.g., [0, 10], (10, 20], and (20, 30]), the respective aggregated buckets at [15, 30, 45].

In some examples, the two histograms may not have the same bucket scheme. In these cases, linear interpolation can be used to determine fractions of buckets that should be used during the combination. For instance, to combine a first histogram with three buckets with a second histogram with two, the first and third buckets of the first histogram can be each combined with half of the contents of the second bucket. The resulting sums can then be added to the two buckets of the second histogram. A reverse approach can be used as well: one sixth of each of the first and second buckets of the second histogram can be combined to make a middle second bucket, which three can then be added to the three buckets of the first histogram. This is a simple example of a linear interpolation that divides and combines buckets as needed to match bucket schemes. More complex interpolation methods can be used that incorporate other information such as rates of change, historical data patterns, and so on. The linear interpolation may be configurable.

At sub-block 550, the quantizer 130 combines the other datapoints in the set of datapoints and the combined datapoints by repeating 520, 530, and 540, until there only one combined datapoint for the entire set of datapoints. For example, a third histogram may be identified by the quantizer 130 and combined using a suitable aggregation method with the combined histogram developed in sub-block 540 above. A combination of aggregation methods can be used in cases in which the value range or class interval vary between identified histograms.

At sub-block 560, the quantizer 130 outputs the single combined datapoint as an aggregate datapoint, the aggregate datapoint comprising aggregate data and representing an aggregate histogram that is an aggregation of the histograms corresponding to the set of datapoints. For example, the aggregate datapoint may be output to the storage subsystem 140 or to the query subsystem 160. The query subsystem 160 can receive queries including selections from the plurality of datapoints, the aggregate data, such as the single combined datapoint or aggregate datapoint, or the plurality of statistical measures. The aggregate histogram can then be retrieved from the storage subsystem 140 or from an ephemeral memory of the query subsystem 160 and used alone or in combination with other retrieved data to generate reports, dashboards, notifications, and so on.

In some examples, other steps not shown may be used during histogram combination. For example, when combining histograms that may be based on different approaches to counting, it may be necessary to apply a normalization to one or more of the histograms under combination. For instance, when combining histograms with different bucket boundaries or variable-width buckets, the bin counts can be scaled so that the buckets can be meaningfully combined, such as by representing the same total number of observations. Other steps for histogram pre- or post-processing may be likewise necessary.

Figure 6:
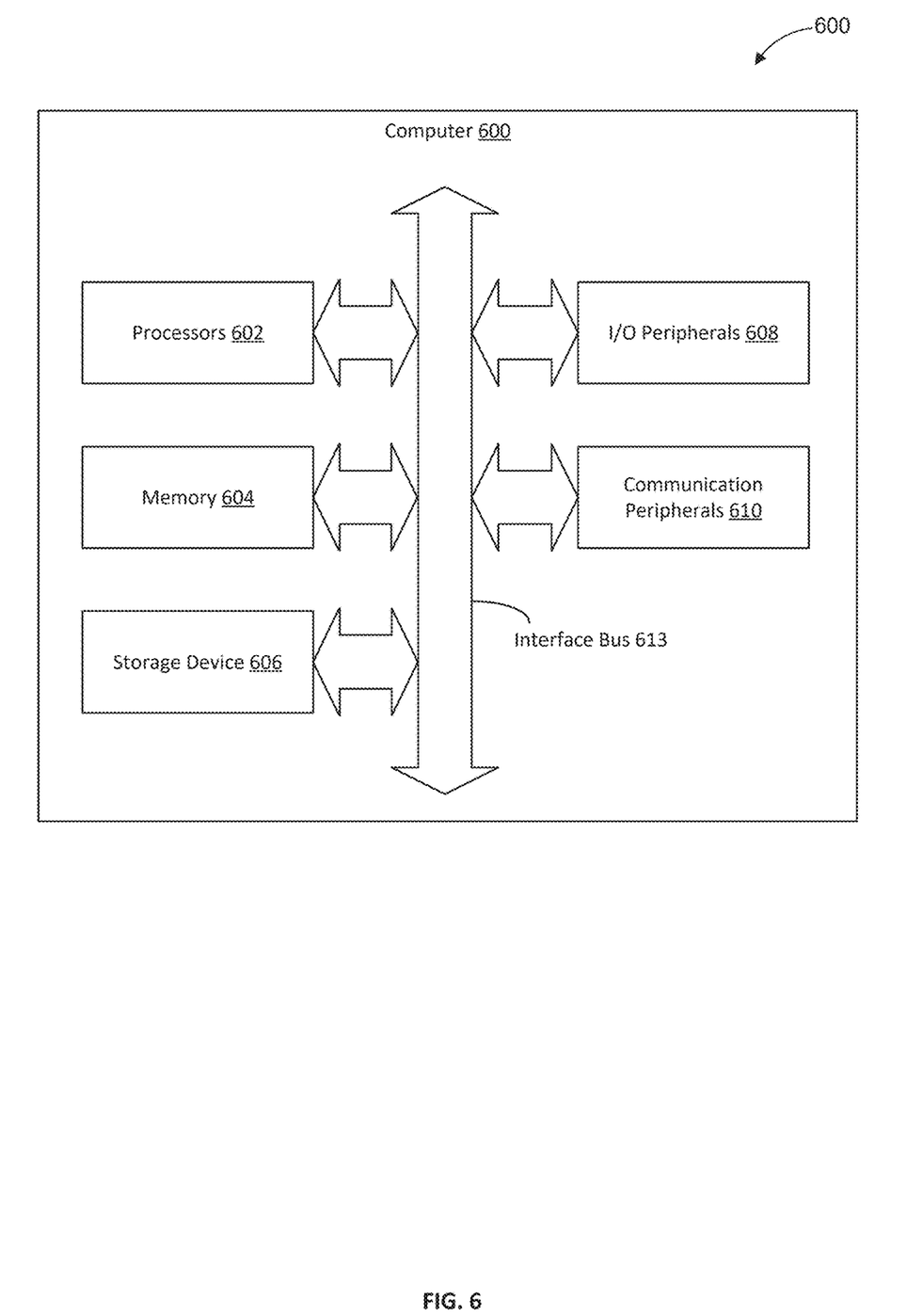
FIG. 6 illustrates an example of an architecture of a computer, according to some aspects of the present disclosure.

FIG. 6 illustrates an example of an architecture of a computer 600. The computer 600 includes at least processors 602, a memory 604, a storage device 606, input/output peripherals (I/O) 608, communication peripherals 610, and an interface bus 612. The interface bus 612 is configured to communicate, transmit, and transfer data, controls, and commands among the various components of the computer 600. The memory 604 and the storage device 606 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such non-transitory computer readable storage media can be configured to store instructions or program codes embodying aspects of the disclosure. The memory 604 and the storage device 606 also include computer readable signal media. A computer readable signal medium includes a propagated data signal with computer readable program code embodied therein. Such a propagated signal takes any of a variety of forms including, but not limited to, electric, optical, or any combination thereof. A computer readable signal medium includes any computer readable medium that is not a computer readable storage medium and that can communicate, propagate, or transport a program for use in connection with the computer 600.

Further, the memory 604 includes an operating system, programs, and applications. The processors 602 can include a controller. At least one of the processors 602 is configured to execute the stored instructions and includes, for example, a logical processing unit, a microprocessor, a digital signal processor, and other processors. The I/O peripherals 608 include user interfaces, such as a keyboard, screen (e.g., an electrophoretic panel with a panel controller), microphone, speaker, other input/output devices, and computing components, such as graphical processing units, serial ports, parallel ports, universal serial buses, and other input/output peripherals. The I/O peripherals 608 are connected to the processor 602 through any of the ports coupled to the interface bus 612. The communication peripherals 610 are configured to facilitate communication between the computer 600 and other computers over a communication network and include, for example, a network interface controller, modem, wireless and wired interface cards, antenna, and other communication peripherals.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
  receiving, by an observability system comprising one or more data processing systems, a plurality of datapoints, wherein each datapoint in the plurality of datapoints comprises a plurality of values for a structure representing a data distribution, and wherein the plurality of values comprise
    a first plurality of values for a first dimension for the structure representing the data distribution, and
    a second plurality of values for a second dimension for the structure representing the data distribution, each value in the second plurality of values corresponding to a value in the first plurality of values;
  processing, by the observability system, the plurality of datapoints for each of a plurality of time periods, wherein, for a first time period in the plurality of time periods, the processing comprises
    identifying, by the observability system, from the plurality of datapoints, a first plurality of datapoints corresponding to the first time period,
    generating, by the observability system, aggregate data based upon the first plurality of datapoints wherein the aggregate data represents an aggregate structure that is an aggregation of the structures representing data distributions corresponding to the first plurality of datapoints, and
    computing, by the observability system, a plurality of statistical measures based upon the aggregate data; and
  enabling, by the observability system, querying of the plurality of datapoints, the aggregate data, and the plurality of statistical measures.

2. The method of claim 1, further comprising:
  for the first time period, generating, by the observability system, a visualization based upon at least one of: the aggregate data, the first plurality of datapoints, or the plurality of statistical measures; and
  causing the visualization to be displayed via an output device.

3. The method of claim 1, wherein the plurality of datapoints is received via a data stream.

4. The method of claim 1, wherein the structure representing the data distribution is a histogram.

5. The method of claim 1, wherein:
  the structure representing the data distribution comprises a plurality of buckets;
  the first plurality of values for the first dimension of the structure representing the data distribution corresponds to a plurality of value ranges or classes associated with the plurality of buckets; and
  the second plurality of values for the second dimension of the structure representing the data distribution corresponds to a set of counts associated with the plurality of buckets.

6. The method of claim 1, wherein the aggregate structure that is an aggregation of the structures representing data distributions is a histogram.

7. The method of claim 1, wherein the plurality of statistical measures includes at least one of a mean, a median, a mode, a range, a standard deviation, percentiles, a skewness, or kurtosis.

8. The method of claim 1, wherein the plurality of statistical measures includes at least one scalar statistical measure.

9. The method of claim 1, wherein the enabling querying of the plurality of datapoints, the aggregate data, and the plurality of statistical measures comprises enabling the querying within 2 seconds of the receiving of the plurality of datapoints by the observability system.

10. The method of claim 1, further comprising:
  storing each datapoint of the plurality of datapoints;
  storing the aggregate data; and
  storing the plurality of statistical measures.

11. The method of claim 1 further comprising:
  receiving, by the observability system, a query; and
  responsive to receiving the query, querying by the observability system, at least one of the plurality of datapoints, the aggregate data, or the plurality of statistical measures using an analytics pipeline scripting language.

12. The method of claim 1, wherein the observability system is implemented using cloud infrastructure provided by a cloud services provider.

13. The method of claim 1, wherein:
  each datapoint in the plurality of datapoints further comprises a third plurality of values for a third dimension for the structure representing the data distribution; and
  each value in the second plurality of values corresponds to a first value in the first plurality of values and a second value in the third plurality of values.

14. A non-transitory computer-readable medium storing instructions that, when executed by one or more processors, cause the one or more processors to perform operations including:
  receiving, by an observability system comprising one or more data processing systems, a plurality of datapoints, wherein each datapoint in the plurality of datapoints comprises a plurality of values for a structure representing a data distribution, and wherein the plurality of values comprise
    a first plurality of values for a first dimension for a structure representing a data distribution, and
    a second plurality of values for a second dimension for the structure representing the data distribution, each value in the second plurality of values corresponding to a value in the first plurality of values;
  processing, by the observability system, the plurality of datapoints for each of a plurality of time periods, wherein, for a first time period in the plurality of time periods, the processing comprises
    identifying, by the observability system, from the plurality of datapoints, a first plurality of datapoints corresponding to the first time period,
    generating, by the observability system, aggregate data based upon the first plurality of datapoints wherein the aggregate data represents an aggregate structure that is an aggregation of the structures representing data distributions corresponding to the first plurality of datapoints, and
    computing, by the observability system, a plurality of statistical measures based upon the aggregate data; and
  enabling, by the observability system, querying of the plurality of datapoints, the aggregate data, and the plurality of statistical measures.

15. The non-transitory computer-readable medium of claim 14, wherein for each datapoint in the plurality of datapoints:
  the first plurality of values and the second plurality of values are for a histogram;
  the first plurality of values corresponds to a plurality of value ranges or classes for the histogram; and
  the second plurality of values corresponds to a set of counts associated with the plurality of value ranges or classes.

16. The non-transitory computer-readable medium of claim 14, wherein the enabling querying of the plurality of datapoints, the aggregate data, and the plurality of statistical measures comprises enabling the querying within 2 seconds of the receiving of the plurality of datapoints by the observability system.

17. The non-transitory computer-readable medium of claim 14, wherein the observability system is implemented using cloud infrastructure provided by a cloud services provider.

18. A system comprising:
  one or more processors; and
  one or more computer-readable storage media storing instructions which, when executed by the one or more processors, cause the one or more processors to perform operations including:
    receiving, by an observability system comprising one or more data processing systems, a plurality of datapoints, wherein each datapoint in the plurality of datapoints comprises a plurality of values for a structure representing a data distribution, and wherein the plurality of values comprise
      a first plurality of values for a first dimension for a structure representing a data distribution, and
      a second plurality of values for a second dimension for the structure representing the data distribution, each value in the second plurality of values corresponding to a value in the first plurality of values;
    processing, by the observability system, the plurality of datapoints for each of a plurality of time periods, wherein, for a first time period in the plurality of time periods, the processing comprises
      identifying, by the observability system, from the plurality of datapoints, a first plurality of datapoints corresponding to the first time period,
      generating, by the observability system, aggregate data based upon the first plurality of datapoints wherein the aggregate data represents an aggregate structure that is an aggregation of the structures representing data distributions corresponding to the first plurality of datapoints, and
      computing, by the observability system, a plurality of statistical measures based upon the aggregate data; and
    enabling, by the observability system, querying of the plurality of datapoints, the aggregate data, and the plurality of statistical measures.

19. The system of claim 18, wherein:
  for each datapoint in the plurality of datapoints:
    the first plurality of values and the second plurality of values are for a histogram;
    the first plurality of values corresponds to a plurality of value ranges or classes for the histogram; and
    the second plurality of values corresponds to a set of counts associated with the plurality of value ranges or classes.

20. The system of claim 18, wherein the observability system is implemented using cloud infrastructure provided by a cloud services provider.

* * * * *